United States Patent Office 2,730,500
Patented Jan. 10, 1956

2,730,500
ANTI-OXIDANTS

David W. Young, Roselle, Arnold J. Morway, Clark, and Delmer L. Cottle, Highland Park, N. J., assignors to Esso Research and Engineering Company, a corporation of Delaware No Drawing. Application September 21, 1951,
Serial No. 247,756

2 Claims. (Cl. 252—51.5)

This invention relates to the stabilization of organic compounds which tend to deteriorate in storage or in use due to undesirable oxidation reactions. In accordance with this invention these organic compounds and especially hydrocarbon type compounds are stabilized against oxidation by incorporating therein small amounts of p-acyl-aminoresorcinols.

Various organic compounds and mixtures thereof including motor fuels, mineral oils, resins, insecticides, soaps, lubricating oils, drying oils, ethers, alcohols, esters, waxes, rubbers, animal and vegetable fats, and oils, etc., are adversely affected by oxygen with the resulting formation of undesirable gums, and usually by discoloration of the organic compounds as well as other deleterious reactions.

Thus for example, in the oil refining industry in order to prepare fuel of superior quality, it is generally necessary to stabilize the fuel against degradation which would mainly occur due to oxidation of the fuel components. In general hydrocarbon mixtures falling in the gasoline or lubricating oil boiling range, if unstabilized, are subject to gum formation, sludge formation, the formation of acids and the formation of objectionable color bodies.

It is also known that synthetic rubbers undergo changes due to further polymerization or degradation which is in turn due to depolymerization and exposure to air. Consequently, they yield inferior products on vulcanization unless there is incorporated therewith, at the time of synthesis, a compound which stabilizes the synthetic rubber. The stabilizing agent acts to prevent oxidation, degradation, and/or cyclization of the long chain molecules present in the polymer structure. Natural as well as synthetic rubbers require an anti-oxidant present in the vulcanizate in order that the finished rubber products may be stable to oxidation and heat during their useful life.

The various p-aminophenols have been employed in the past as anti-oxidants for organic materials, but these compounds suffer from the serious defects of being color unstable and cause discoloring of substances such as rubbers, enamels, pigments, and the like.

It has now been found that acyl-p-aminoresorcinols, wherein the acyl component has at least three carbon atoms, are extremely effective oxidation inhibitors and stabilizers in organic materials which usually become degraded in the presence of air and/or heat. The resulting compositions of this invention do not suffer from any of the disadvantages of p-amino-phenols, i. e. they are color stable and are non-staining even in rubbers.

The reason for the utility of the acyl-p-aminoresorcinols in solid organic materials as contrasted to the liquid hydrocarbon materials is that they stay dispersed in the matrix of the solid materials such as rubbers and greases. This is especially true of the high molecular weight acyl-p-aminoresorcinols which are especially unsuited for use in gasolines, because of their low volatility.

Suitable acyl-p-aminoresorcinol compounds of the indicated type are illustrated in Formula I below:

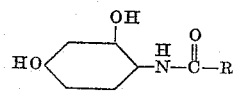

wherein R is a hydrocarbon radical having one or more carbon atoms and can either be aliphatic, aromatic, alicyclic or an alkyaryl radical.

Those compounds wherein R is an alkyl radical having from 4 to 18 carbon atoms are especially effective. This latter class of compounds are of particularly good color and are economical to prepare. A particularly effective and desirable material of the class of compounds of this invention is N-lauroyl-p-aminoresorcinol.

Among the other particular compounds which may be utilized for the purpose of this invention are those in which the acyl group is derived from the following acids: butyric ($C_4$); caprylic ($C_8$); capric ($C_{10}$); lauric ($C_{12}$); myristic ($C_{13}$); palmitic ($C_{16}$); stearic ($C_{18}$); undecylenic ($C_{11}$); oleic ($C_{18}$); linoleic ($C_{18}$); cyclohexylvaleric ($C_{11}$); Oxo acid ($C_9$); Oxo acid; naphthenic acid.

Although the preferred embodiment of the invention contemplates the use of compounds in which the acyl group is derived from monocarboxylic acids as above, it is also contemplated to prepare compounds using dibasic acids or dibasic acid chlorides, thus joining two mols of amino resorcinol. In this concept 2 mols of the resorcinol is used per mol of dibasic acid. Operable among the dibasic acids used are oxalic, succinic, glutoric, adipic, pimelic, suberic, azelaid, sebacic, dilinoleic, dilinolenic, and the like.

It is to be noted that other amino dihydroxy benzenes may also be used to form materials suitable for use as the anti-oxidants of invention. With amino resorcinol there may be mentioned as operable such materials as amino catechol, amino hydroquinone, and the like.

It should be noted particularly that many of the compounds of this invention are new chemicals. The compounds utilized in the anti-oxidant synthesis of this invention, are largely water insoluble and oil soluble, a desirable combination of characteristics. They are mostly white waxy solids and can be employed in colorless synthetic waxes.

The compounds of this invention can be prepared in general by reacting an approximate equimolar amount of the acid anhydride or acid chloride with the amino resorcinol in the presence of a solvent, such as benzene, toluene or xylene. The product is then dehydrated by evaporation and the product obtained is in relatively pure form. If desired, the product can be washed with water or dilute sodium carbonate solution. A yield of over 80% of the acyl-p-aminoresorcinol is generally obtained. This reaction is indicated by the formula below:

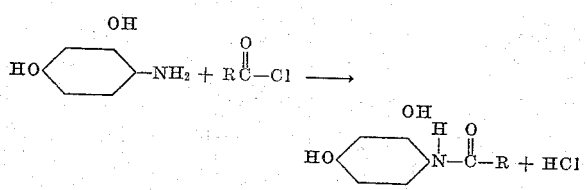

The following examples are given to illustrate this invention:

EXAMPLE I

N-stearoyl-p-amino resorcinol was prepared by reacting equimolar proportions of p-amino-resorcinol and stearic acid in the presence of 1 mol of xylene to azeotrope out the water. The material was then blended in 1% by weight concentration with a lubricating grease composition having the following general formulation:

77.75% di-2-ethyl hexyl sebacate
21.75% lithium stearate
.50% zinc naphthenate

The blend was prepared by heating the grease base to a temperature of about 138° C. and adding the N-stearoyl-p-amino resorcinol. Upon cooling to room temperature the grease composition containing the acyl-p-amino resorcinol was a stable composition of excellent appearance.

The experimental grease prepared as described above was then subjected to the standard Norma-Hoffman oxidation bomb test. This oxidation test is well described in the patent literature and involves subjecting a given amount of a grease to a constant temperature, usually 100° C. under an oxygen pressure of 110 p. s. i. The loss in oxygen pressure is a function of the oxidation resistance of the composition, that is to say, a grease that is highly resistant to oxidation will show a small pressure drop after an extended period of test time.

The results of the grease prepared as described above in the standard Norma-Hoffman oxidation bomb test is given in Table I below. Along with the grease of invention there is given data of the same grease base without an anti-oxidant and with 1% of two commercially available anti-oxidants hitherto thought to be the best lubricating grease anti-oxidants known.

TABLE I

*Norma-Hoffman oxidation test*

[Lithium stearate—Di-2-ethylhexyl sebacate base.]

| Wt. Percent Anti-oxidant | Hrs. to 4# Pressure Drop | Hrs. to 10# Pressure Drop |
| --- | --- | --- |
| 0 | 75 | 188 |
| 1% N-stearoyl p-amino resorcinol | 670 | 1,620 |
| 1% Diphenylol propane | 505 | 780 |
| 1%, 2,6-di-tert.-butyl-p-cresol | 110 | 222 |

An examination of the data of Table I above points out the outstanding anti-oxidizing effect of the material of invention. 1% of the N-stearoyl p-amino-resorcinol raised the "4#" life of the grease base from 75 hours to 670 hours and the "10# life" from 188 hours to 1620 hours. These lives are very favorable when compared to the two hitherto superior antioxidants given.

Although in the example given above the novel antioxidant of the invention was blended with a lubricating grease prepared with a synthetic lubricating oil base, it is to be understood that any of the well known lubricating grease compositions are improved by incorporating therein the acyl-p-amino resorcinol as described. The oxidation stability of greases prepared by thickening mineral oils with alkali or alkaline earth metal soaps of substantially saturated fatty acids is greatly improved by combining with them these anti-oxidants.

EXAMPLE II

.5% by weight of the lauric acid derivative of p-aminoresorcinol which was formed by reacting equimolar proportions of lauric acid and p-aminoresorcinol, was blended in a rubber mill at 250° F. with a polyisobutylene synthetic rubber having a molecular weight of 85,000 Staudinger. The mixture was worked in the rubber mill for a period of five minutes. The treated rubber was then evaluated in a laboratory breakdown test conducted at 110° C. to evaluate the oxidation resistant effect of the additive agent. In this test the polyisobutylene was cut up into very small sections about ⅛ of an inch on a side and placed on a watch glass in an air oven held at the temperature mentioned above. The air in the oven was constantly circulating. The molecular weight breakdown results are recorded in Table II below:

TABLE II

*Antioxidant effect of N-lauroyl p-aminoresorcinol—polyisobutylene compositions (85,000 Staudinger mol. wt.)*

| Duration of Test | Temperature, °C. | Mol. Wt. of Polymer | |
| --- | --- | --- | --- |
| | | w./o. antioxidant | with 0.5% of N-lauroyl-p-amino resorcinol |
| 24 hours | 110 | 83,000 | 85,000 |
| 48 hours | 110 | 82,000 | 83,000 |
| 7 days | 110 | 81,000 | 82,000 |
| 14 days | 110 | 46,000 | 81,000 |
| 21 days | 110 | 26,000 | 75,000 |

An examination of the data of Table II above clearly shows the anti-oxidant effect of the materials of invention when compounded with polyisobutylene. After 21 days at 110° C. the untreated rubber showed a molecular weight loss of 59,000 units, whereas the treated rubber lost only 10,000 units.

EXAMPLE III

The same general oxidation test as performed on the polyisobutylene synthetic rubber of Example II was repeated for GR-1 Butyl rubber. This synthetic rubber is a copolymer of butadiene and isoprene which is prepared in a manner familiar to the art. The results in the air oven test are recorded in Table III below:

TABLE III

*Antioxidant effect of N-lauroyl p-aminoresorcinol in Butyl rubber*

[74% butadiene—26% isoprene; mol. wt. 35,000.]

| Duration of Test | Temperature, °C. | Mol. Wt. of Polymer | |
| --- | --- | --- | --- |
| | | w./o. antioxidant | with 0.5% N-lauroyl-p-aminoresorcinol |
| 1 day | 110 | 33,000 | 35,000 |
| 3 days | 110 | 22,000 | 34,000 |
| 7 days | 110 | 14,000 | 31,000 |

It is to be noted that while the untreated rubber was reduced to a molecular weight of 14,000 after 7 days at 110° C., the additive of invention maintained the polymer molecular weight at 31,000.

EXAMPLE IV

In another experiment there was evaluated N-lauroyl-p-aminoresorcinol in a synthetic rubber known as "Paracril." This synthetic rubber is a copolymer formed by copolymerizing butadiene and acrylonitrile. The nitrile content of the polymer is 26% by weight and its Mooney viscosity at 212° F. is 90.

In this oxidation test the sample of rubber tested was held in a darkened air oven 60° C. The air was circulated continually therein. The portions of the polymer tested were very small about 3″ and 4″ and were held in Nichrome wire baskets. Due to a large amount of butadiene in the copolymer, this product has a tendency to form a gelatinous polymer in the presence of light and heat. This particular gelatinous polymer is very undesirable in the finished product. The results of this test are recorded in Table IV below:

TABLE IV

Antioxidant effect of N-lauroyl p-aminoresorcinol on Paracril

[26% acrylonitrile—74% butadiene.]

| Duration of Test | Temperature, °C. | Percent Insoluble Gel | |
|---|---|---|---|
| | | w/o antioxidant | with 0.5% N-lauroyl p-aminoresorcinol |
| 7 days | 60 | 35.8 | 6.2 |
| 14 days | 60 | 74.8 | 12.5 |
| 21 days | 60 | 98.8 | 33.3 |

It is seen that the inhibiting effect of the compound of invention is pronounced in that only 33⅓% of gel formation was obtained with the N-lauroyl p-aminoresorcinol, whereas the uninhibited rubber was converted almost completely to the insoluble gel.

The examples immediately preceding point out the anti-oxidant effect of the acyl p-aminoresorcinols of invention and three of the most commonly used synthetic rubber compositions, that is, polymers of polyisobutylene, copolymers of butadiene and isoprene and copolymers of butadiene and acrylonitrile. It is to be understood, however, that any of the well known synthetic rubber materials which are subject to breakdown by oxidation are improved by the incorporation of the anti-oxidant of invention. Those synthetic rubbers having molecular weights ranging from about 40,000 to 300,000 are included among those benefited by the incorporation of the anti-oxidants of invention.

EXAMPLE V

N-butyryl p-aminoresorcinol was evaluated as an anti-oxidant in a synthetic lubricating oil. The structure of this anti-oxidant is given below:

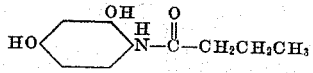

The above product was tested at 0.5 wt. % concentration in a di-2-ethylhexyl sebacate synthetic lubricating oil. Oxidation results on this blend are given in the following table:

TABLE V

Oxidation tests on blend of 0.5% N-butyryl p-aminoresorcinol in di-2-ethylhexyl sebacate-metal strip at 250° F. for 168 hours.

| | No antioxidant | 0.5% of N-butyryl p-aminoresorcinol |
|---|---|---|
| Corrosion and Oxidation: | | |
| Wt. change (mg./cm.²)— | | |
| Steel | +0.01 | +0.01. |
| Aluminum Alloy | +0.01 | +0.01. |
| Magnesium Alloy | −0.01 | −0.02. |
| Cadmium Plated Steel | +1.48 | −0.01. |
| Copper | 0.00 | −0.01. |
| Visible Corrosion: | | |
| Steel | Brown | Colorless. |
| Aluminum Alloy | None | Do. |
| Magnesium Alloy | Grey | Do. |
| Cadmium Plated Steel | Etched | Do. |
| Copper | None | Do. |
| Percent Oil Loss | 5.6 | 3.1. |
| Viscosity change at 130°F., percent | +87.5 | 3.7. |
| Neutralization No. Increase | 75.1 | 0.2. |
| Appearance of Oil | Gummy | Clear. |

The data of Table V above point out the advantage of the oil blend containing the material of invention over the uninhibited oil. It is to be especially noted that while the weight change remained approximately constant in all cases except with the cadmium plated steel, the visible corrosion was markedly improved, the oil loss was reduced, viscosity change was much less, the neutralization number increase was negligible, and the inhibited oil had an excellent appearance after the stringent oxidation test.

To summarize briefly, this invention relates to the improvement in oxidation stability of organic materials, which are subject to oxidation changes by the incorporation therein of minor amounts of an N-acyl p-aminoresorcinol wherein the acyl group contains 1 or more carbon atoms. Particularly preferred as antioxidants are those p-aminoresorcinol derivatives in which the acyl group contains from 4 to 18 carbon atoms with the lauroyl and stearoyl derivative being especially preferred. Depending upon the type of hydrocarbon material from 0.1% to 10% by weight, preferably 0.3% to 6% of the antioxidant is incorporated therein.

It has also been found that the N-acyl-p-aminoresorcinols can be employed as mill roll agents, mold lubricants, feed stabilizers, and processing aids for rubber resins, polyethylene, halogenated polyethylene, halogenated wax, polymers of styrene and isobutylene, and the like.

What is claimed is:

1. A composition of matter comprising di-2-ethylhexyl sebacate containing combined therein a minor proportion effective as an anti-oxidant of an N-acyl-p-aminoresorcinol having the general formula

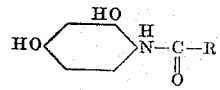

wherein R is an alkyl group having from 4 to 18 carbon atoms.

2. A composition according to claim 1 wherein R has 18 carbon atoms.

References Cited in the file of this patent

UNITED STATES PATENTS

| 1,789,302 | Calcott | Jan. 20, 1931 |
| 1,938,456 | Lankelma | Dec. 5, 1933 |
| 1,945,521 | Downing | Feb. 6, 1934 |
| 2,604,452 | Morway | July 22, 1952 |
| 2,625,557 | Cottle | Jan. 13, 1953 |
| 2,629,666 | Morway | Feb. 24, 1953 |